United States Patent [19]
Amanai

[11] Patent Number: 5,273,294
[45] Date of Patent: Dec. 28, 1993

[54] GAME MEMORY

[75] Inventor: Jun Amanai, Tokyo, Japan

[73] Assignee: Tengen Ltd., Tokyo, Japan

[21] Appl. No.: 44,107

[22] Filed: Apr. 9, 1993

Related U.S. Application Data

[63] Continuation of Ser. No. 828,303, Jan. 30, 1992, abandoned.

[30] Foreign Application Priority Data

Feb. 4, 1991 [JP] Japan ................... 3-013546

[51] Int. Cl.⁵ ............................... A63F 9/22
[52] U.S. Cl. ................... 273/435; 273/148 B
[58] Field of Search .............. 273/433, 434, 435, 436, 273/460, 148 B, DIG. 28, 85 G; 364/410

[56] References Cited

U.S. PATENT DOCUMENTS

| | | | |
|---|---|---|---|
| 4,485,457 | 11/1984 | Balaska et al. | 364/900 |
| 4,587,640 | 5/1986 | Saitoh | 365/229 |
| 4,752,068 | 6/1988 | Endo | 273/434 |
| 4,858,930 | 8/1989 | Sato | 273/434 |
| 5,014,982 | 5/1991 | Okada et al. | 273/435 |
| 5,128,863 | 7/1992 | Nakamura et al. | 364/410 |

FOREIGN PATENT DOCUMENTS

| | | | |
|---|---|---|---|
| 0431723 | 6/1991 | European Pat. Off. | 273/435 |
| 2239810 | 7/1991 | United Kingdom | 273/436 |
| 0840834 | 12/1984 | World Int. Prop. O. | 273/435 |

OTHER PUBLICATIONS

"This Fall . . . Neo.Geo" Advertisement, Playmeter Oct. 1990 pp. 24-25.

Primary Examiner—Jessica J. Harrison
Attorney, Agent, or Firm—Kanesaka and Takeuchi

[57] ABSTRACT

Game equipment having a read-only memory storing a game program, as well as a microprocessor, random-access memories (RAMs), an operation keyboard and a picture display screen, wherein the microprocessor controls registers such as those constituting a screen RAM and a data RAM in accordance with the program stored in the read-only memory. The equipment includes a backup battery and a backup memory to which the supply of power is ensured by the backup battery, and also includes a recognition section for recognizing information on particular registers used to display a picture on the picture display screen, a transfer section for transferring the information on the registers recognized by the recognition section to a storage provided in the backup memory, and a drive section for causing the transfer means to automatically repeat transfer operations at a required timing. The storage is adapted, when new information on particular registers has been transferred by the transfer means, to erase the previously stored information and store the new information.

12 Claims, 5 Drawing Sheets

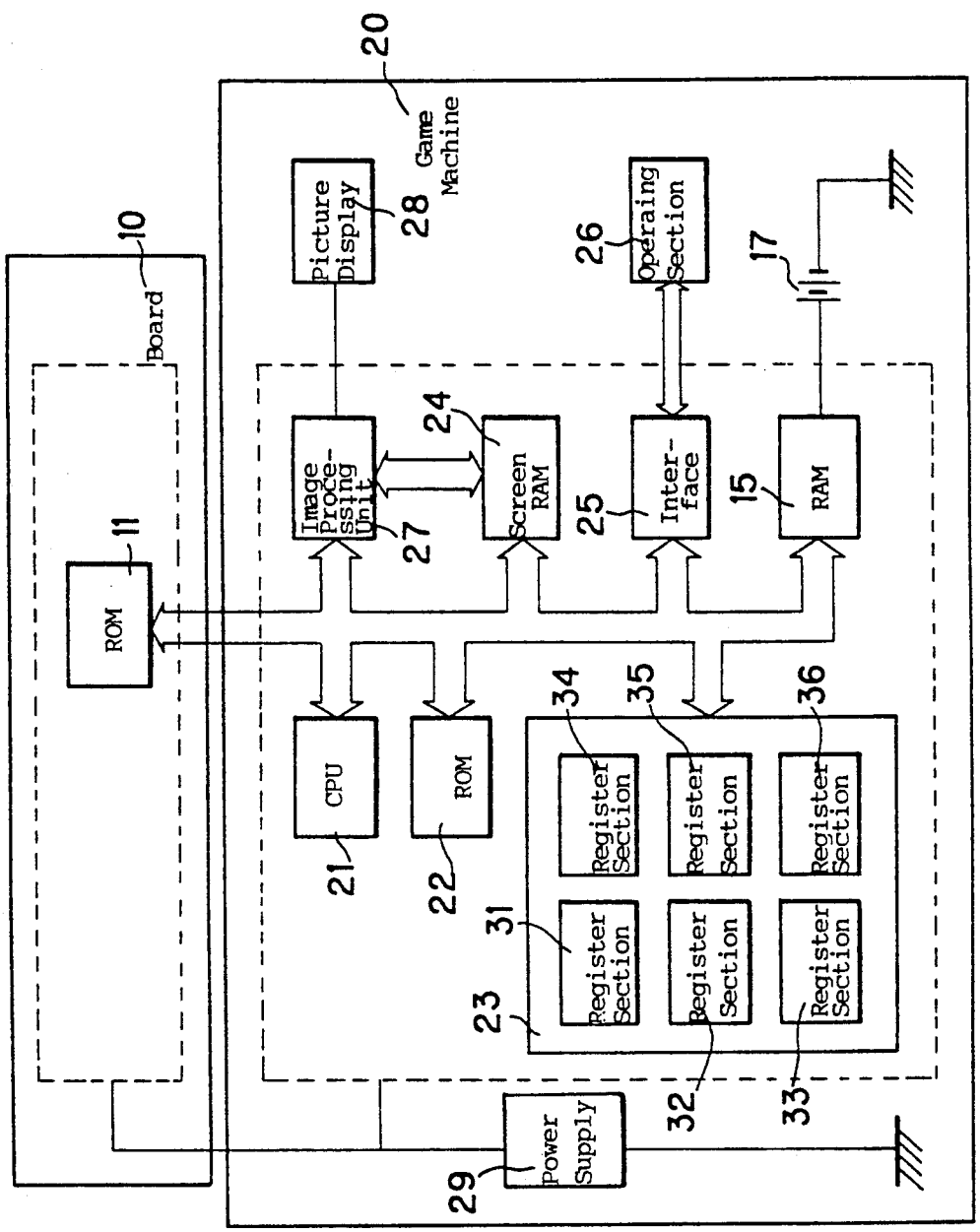

GAME MEMORY

This application is a continuation of application Ser. No. 828,303, filed Jan. 30, 1992, now abandoned.

BACKGROUND OF THE INVENTION

1. Field of the Invention

The present invention relates to game equipment which employs a picture display screen, and on which various games such as a role-playing game and a puzzle game can be played.

2. Description of the Related Art

A common type of a conventional game equipment employing a picture display screen allows a game to be played thereon when a board in which a game program has been stored, is inserted into a receptacle of the game machine of the game equipment. The board has a read-only memory (hereinafter referred to as a "ROM") storing the game program. After the board is connected with the game machine, the game proceeds with pictures for the game being displayed on the display screen of a picture display such as a liquid crystal display (hereinafter referred to as an "LCD") provided on the game machine or a television receiver (hereinafter referred to as a "CRT") connected with the game machine, while the player operates on operation buttons, etc. of the game machine.

The game machine has a microprocessor (hereinafter referred to as a "CPU") for controlling selections made in the game and the proceeding of the game, etc., a power supply, and a random-access memory (hereinafter referred to as a "RAM") having a certain fixed capacity. The proceeding of the game is controlled by reading a game program from the ROM of the board, and using a plurality of registers of the RAM incorporated in the game machine. Those registers whose addresses have been specified are used to arrange/rearrange and store information, on the basis of which a title picture and various images for the game are displayed on the picture display such as the LCD or CRT. The other registers are used to cause movement of characters of the game, to read commands, and for other purposes.

Since, in recent years, games which can be played on such game equipment have become complicated, some of the game equipment have been provided with the following arrangement. A RAM and a backup power supply are incorporated in the board so that a selection of a save command during the proceeding of a game may cause the current situation of the game to be stored in the RAM in the board. With this arrangement, even if the power supply for driving the game machine is turned off, the player is able to select how he starts playing the game next time (i.e., starts the next game activity), whether the game is to be restarted or it is to be continued from the situation in which the previous game activity has ended.

Thus, it is possible nowadays to use a board which has a RAM and a backup battery, and which is adapted to store the current situation of the game proceeding in response to a save command. However, there is an inconvenience. Only limited opportunities arise to permit a save command to be input. If a save command has not been input, the game cannot be interrupted but it has to be continued until a subsequent save command will be input. This is inconvenient when the player desires to have a break or has something else to do. In addition, when the game has been hurriedly interrupted by the player because of his urgent business or when the drive power supply of the game machine is almost exhausted, the equipment fails to positively save the game.

Some of the many complicated games (such as role playing games and puzzle games) which have been recently offered, require ten and several hours to several tens of hours to complete one game. If such a game is played on a game machine driven by a battery, there are the following drawbacks and disadvantages. Since, in general, the battery becomes exhausted after a game activity has been continued for several consecutive hours, the battery has to be replaced before one game is completed. Further, since the game must be continued until a save command is input during the proceeding of the game, in the event that the battery has become exhausted in the course of the game, all information occurring after the exhaustion is lost. If, in order to avoid this disadvantage, the battery is replaced earlier than necessary, some of the power is inevitably wasted. The above drawback and disadvantage could be avoided by adopting an arrangement for allowing the current situation represented on the screen to be immediately saved. However, such an arrangement has not been realized.

Even if it is made possible, for example, by some improvement of the battery, to continuously play the game for a long time, there would be another disadvantage. Although the game equipment can be continuously powered even when the player has to interrupt the game because of an emergency, this means the battery is used in vain.

In the case where a domestic power source is used, there is the following disadvantage. When the power source supplying power to the game machine is accidentally disconnected by, for instance, a person tripping over the power cord, at least part of the information on the game proceeding is lost, and the player may have to restart the game.

SUMMARY OF THE INVENTION

An object of the present invention is to enable a game to be securely saved even when the game has to be suddenly interrupted because of the player's urgent business, or when the drive power supply of the game machine is almost exhausted.

Another object of the present invention is to eliminate, in the case where a domestic power source is used, the need to restart a game even when the power source has been abruptly disconnected by, for instance, a person tripping over the electric cord supplying power.

According to the present invention, it is possible to securely save the game even when the game has to be suddenly interrupted because of the player's urgent business, or when the drive power supply of the game machine is almost exhausted. Furthermore, even when the power source has been abruptly disconnected by, for instance, an accident, it is possible, when the game is to be played again, to select whether the game is to be continued from the situation in which the previous game activity has ended, thereby facilitating the completion of one game even in the case of a complicated game.

Specifically, according to the present invention, there is provided a game equipment having a backup RAM, a backup battery and a ROM storing a game program, as well as a CPU, RAMs for various operations, a power supply, a picture display such as an LCD, and an operation keyboard, the equipment comprising: a recognition means for recognizing particular registers used to display a picture on the picture display; a transfer means for performing a transfer so as to store information (such as address information) on the registers recognized by the recognition means into storage means provided in the backup RAM; and a drive means for causing the transfer means to automatically and repeatedly operate at a required timing, the information in the storage means being updated to the newest information (such as the newest address information) on the basis of the information transferred from the transfer means.

With the above-specified construction of the game equipment according to the present invention, a game proceeds while pictures are displayed on the picture display in accordance with a game program stored in the ROM. The recognition means recognizes information (such as addresses information) on particular registers used to display a picture on the picture display, thereby enabling conditions under which the game proceeds to be recognized as the game proceeds. The drive means and the transfer means cooperate with each other to cause the information recognized by the recognition means to be stored automatically and at a required timing into the storage means provided in the backup RAM. Therefore, it is possible to save game proceeding conditions into the backup RAM constantly and in a real time manner.

BRIEF DESCRIPTION OF THE DRAWINGS

FIG. 5 is a block diagram showing a further embodiment of the game equipment according to the present invention.

DESCRIPTION OF THE PREFERRED EMBODIMENTS

Figure 1:
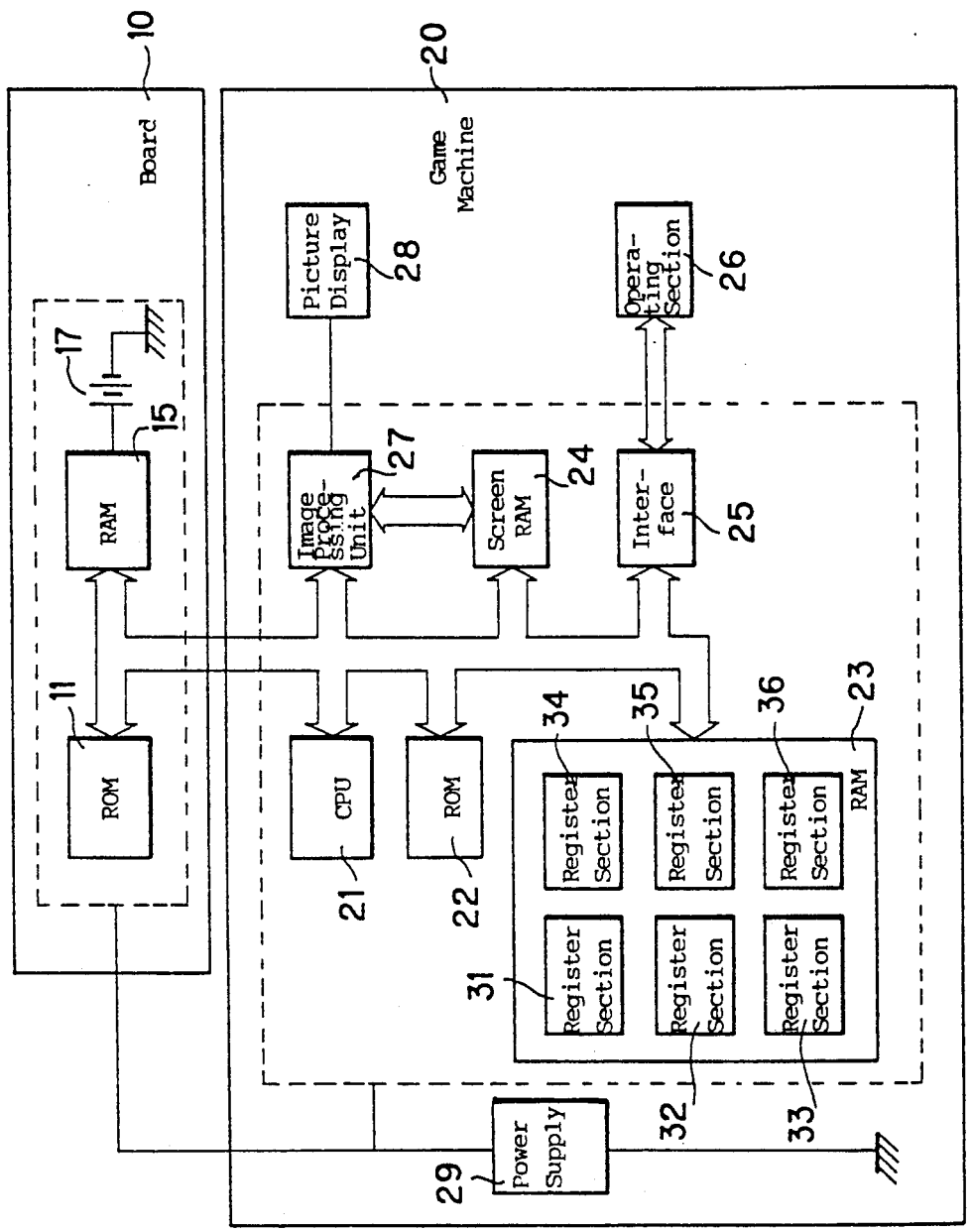
FIG. 1 is a block diagram showing an embodiment of the game equipment according to the present invention.

As shown in FIG. 1, game equipment in accordance with an embodiment of the present invention basically comprises a board 10 and a game machine 20. The board 10 incorporates: a backup battery 17; a RAM 15 serving as a backup memory; and a ROM 11 storing game software. The game machine 20 incorporates: a CPU 21; a ROM 22 storing programs such as a program for starting the CPU 21; an operational RAM 23 in which a plurality of register sections 31, 32, 33, 34, 35 and 36 are provided, and which is used to perform various information processing operations; a screen RAM 24 for storing image data; an interface 25 allowing information resulting from the operation of switches, etc., provided on an operating section 26, to be sent to the CPU 21; an image processing unit 27 for producing a video signal by combining image data together and for sending the produced video signal to a picture display 28 such as an LCD mounted on the game machine 20; and a drive power supply 29 such as a battery. The ROM 11 incorporated in the board 10 stores a game program, in accordance with which the CPU 21 uses registers in the register sections 31 to 36 in the RAM 23 in order to store image data in the screen RAM 24, and controls the image processing unit 27 in order to display images such as those of the background and those of symbols indicating various characters, etc. on the screen of the picture display 28.

Figure 2:
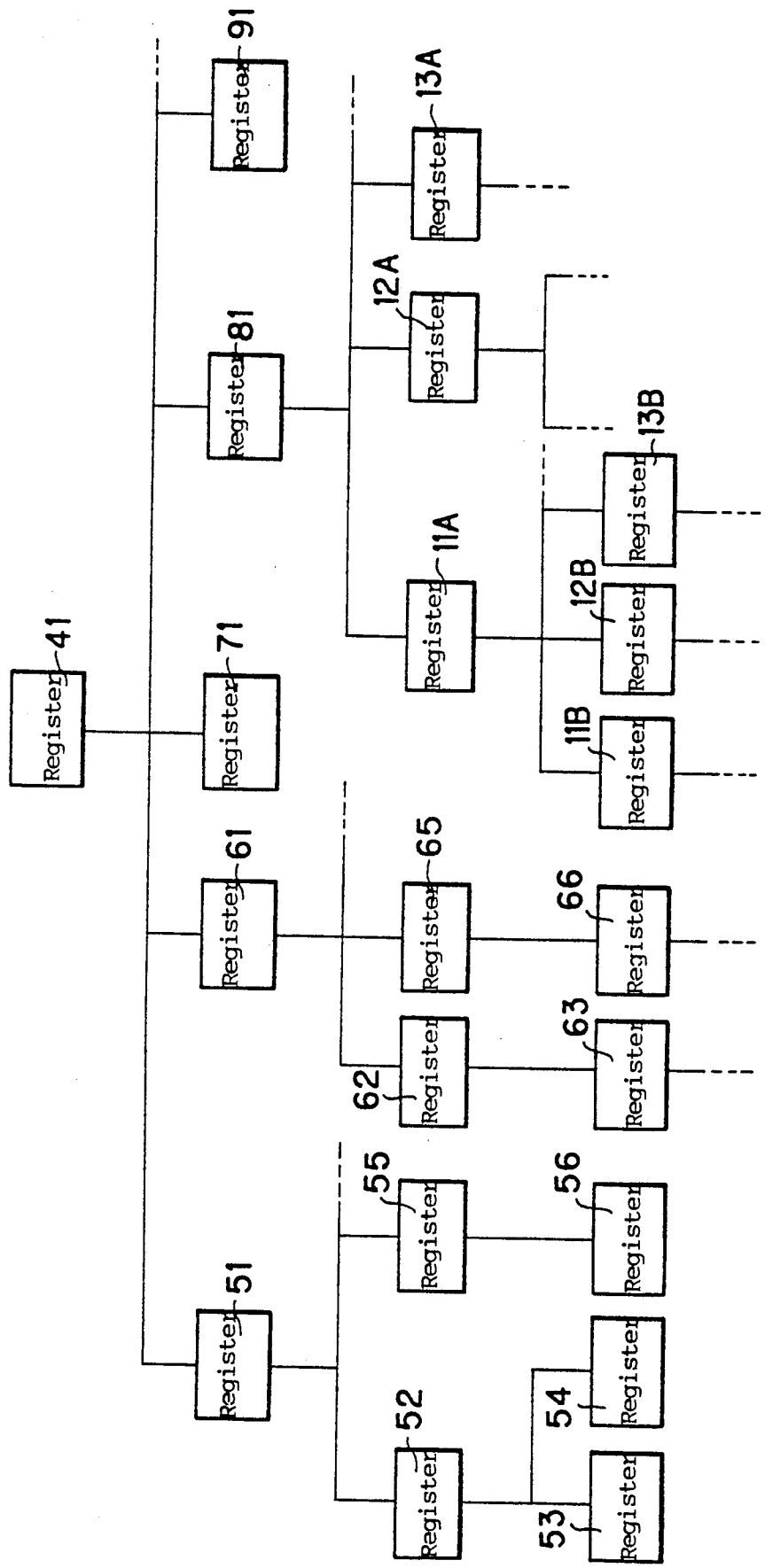
FIG. 2 is a diagram showing an example of the structure of certain registers of the game equipment according to the present invention.

In the game equipment, the RAM 23 has registers divided into the register sections 31 to 36, which sections are provided to store information on the situation of the game being played, information on pictures and other information, and in which a group of image data items are temporarily stored in registers having particular addresses. Some of the registers in the register sections have a structure such as that shown in FIG. 2. The structure includes: a first substructure having a register 41 for storing information for forming a game-start picture; a second sub-structure having a register 51 for storing image data on a title picture, a register 52 for storing information for selecting, on the title picture, one or more commands concerning how the game should proceed, registers 53 and 54 which, when the command(s) have been selected, store information for displaying pictures including change(s) made in accordance with the command selection, and registers 55 and 56 for performing information processing when the player writes certain required data on the title picture; a third substructure including a register 61 for starting a series of demonstration pictures, and registers 62, 63, . . . and 65, 66, . . . for storing information for causing a series of pictures selected for demonstration to run; a fourth sub-structure having a register 71 for storing picture information for allowing a scene to be selected for the game; a fifth substructure including a register 81 for storing information for starting the game, registers 11A, 12A and 13A for storing information for displaying the start pictures at the start of a first stage, a second stage, and a third stage of the game, respectively, and a plurality of registers 11B, 12B and 13B for storing image data for causing movement of symbols such as those indicating characters in the individual the stages; a sixth sub-structure consisting of the registers in the register section 36, these registers serving as situation registers for storing various factors such as the points earned in the game, the number of friend- and foe-characters survived, pieces of music to be played on various scenes of the game, the coordinates of the friend- and foe-characters on the display screen, and the flag of a treasure box or the like; and a seventh sub-structure having a register 91 for storing picture information on a game-over picture. The CPU 21 operates to bring appropriate registers into their operating state while reading the contents of the situation registers 36 to thereby determine each picture, store image data on the determined picture into the screen RAM 24, and cause the image data in the screen RAM 24 to be converted into a video signal by the image processing unit 27 so that a picture is displayed on the picture display 28. The game proceeds while the CPU 21 operates in this way.

In this embodiment, the register section 31, the register section 33 and the register section 35 constitute certain means which provide the following functions when the CPU 21 causes, as described above, image data to be sent to the picture display 28 on the basis of the operation of appropriate registers. The register section 31 stores a signal which is indicative of register addresses and which is output from the CPU 21 in order to bring appropriate registers into their operating state, thereby constituting a recognition means for recognizing information on the addresses of the registers used to cause a display on the picture display 28. The CPU 21 reads the register addresses stored in the recognition means at a time point at which there is a relatively small amount of movement on the display screen, that is, a time point at which a relatively small number of steps per unit time are necessary to the image processing by the CPU 21 (such as a time point at which the picture displayed on the display 28 is changed, or a time point at which the movement of the character(s) is stopped). The game program includes the procedure for transferring the register address information to the RAM 15 incorporated in the board 10. The register section 33 provided in the RAM 23 stores a program to be executed upon the issuance of a loading and saving command for effecting such a transfer, thereby constituting a transfer means for causing the register address information recognized by the recognition means to be stored into the RAM 15 of the board 10. Further, the register section 35 stores information for issuing the loading and saving command, thereby constituting a drive means for operating the transfer means. The RAM 15 in the board 10 has registers provided therein and constituting storage means. The storage means erases, when supplied with an address signal from the transfer means, the previous address information, and stores the newest address information.

Accordingly, when the player has selected a game by operating a switch provided on the game machine 20, the selected game is caused to proceed with the picture on the display being updated. As the game proceeds, information on the conditions under which the game proceeds, such as the updating of the picture, is stored into the storage means of the RAM 15 in the board 10. In the case of a shooting game or the like where a bullet is fired, information on the addresses of particular registers for displaying a picture representing the scene immediately before the firing of a bullet is automatically transferred from the recognition means to the storage means in the RAM 15. In the event that the drive power supply 29 of the game machine 20 becomes exhausted, certain game proceeding conditions immediately before the moment at which the drive power supply 29 has become useless, remain stored in the RAM 15 backed up by the backup battery 17, and the record in the RAM 15 is preserved by virtue of the backup battery 17. This assures that, when the game is to be played again after the replacement of the drive power supply 29, the previous game activity may be continued. That is, when the game is to be played again, the player is able to select, at the start of the subsequent game activity, whether to restart the game or to play the game from the situation in which the previous game activity has ended.

Figure 3:
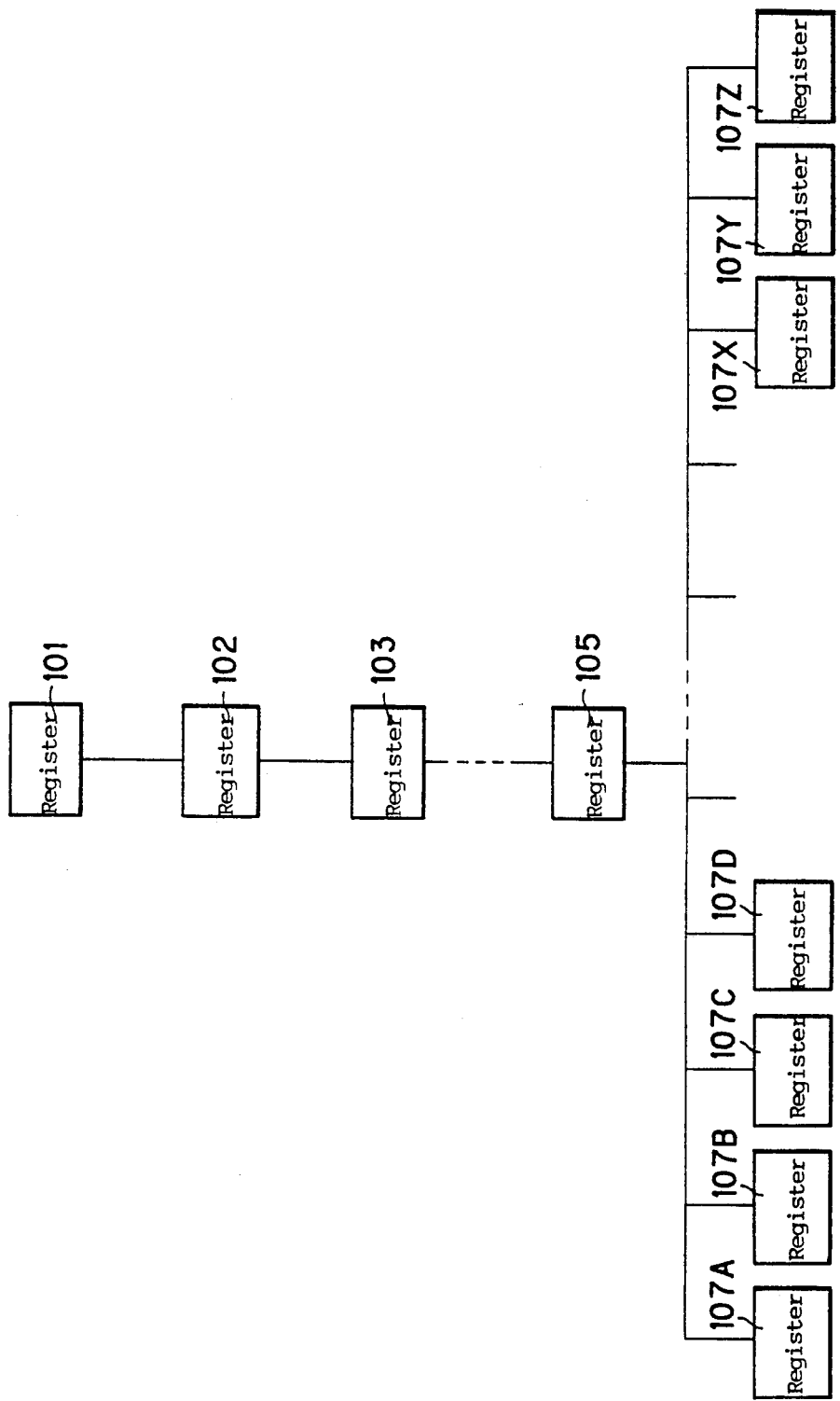
FIG. 3 is a diagram showing another example of the structure of certain registers of the game equipment according to the present invention.

The tree structure constructed in the RAM 23 is not limited to that of the above-described embodiment, and the structure may alternatively be such as that shown in FIG. 3. Here, the structure has an upper sub-structure and a lower sub-structure arranged in series. The upper sub-structure includes registers arranged in series, which registers are: a register 101 for storing information such as information on a title picture, information on a series of demonstration pictures, and information on a game and the completion thereof; a register 102 for storing information such as information for selecting a scene for the game, and information for starting the game; a register 103 for storing, as the game proceeds, information on the number indicating each stage of the game; and a register 105 for storing information on the number indicating the current round in the game. The lower sub-structure includes: registers 107A, 107B, 107C, for storing image information on a background block and other blocks into which a picture is divided; a register 107X for storing the positional coordinates of friend- and foe-characters; a register 107Y for storing information on the number of friend- and foe-characters survived and information on whether the treasure box is opened or not; and a register 107Z for storing information on the numbers assigned to pieces of music and other information. In this embodiment, the following means are provided so that the means are used when items of information stored in various registers are to be combined together to compose a picture: a recognition means for reading certain information on the registers 101, 102, 103 . . . at a required timing; a transfer means for transferring the information recognized by the recognition means to storage means provided in the RAM 15 serving as a backup memory; and a drive means for causing the transfer means to automatically and repeatedly operate at a required timing. The provision of these means enables game proceeding conditions to be constantly stored into the storage means, as in the previous embodiment.

Figure 4:
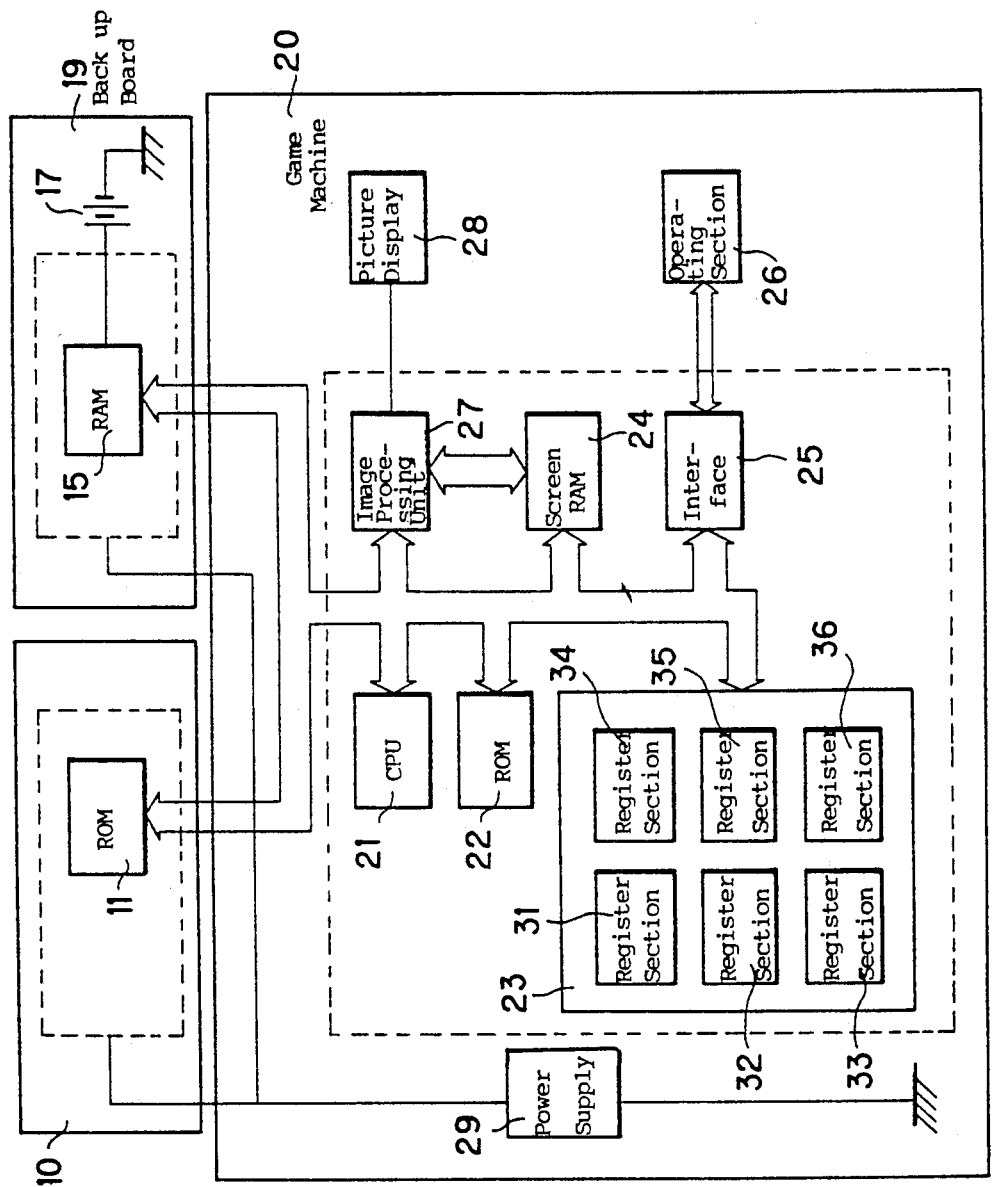
FIG. 4 is block diagram showing another embodiment of the game equipment according to the present invention.

In the above-described embodiments, the backup battery 17 and the RAM 15 serving as the backup memory are incorporated in the board 10 in which the ROM 11 for storing game software is also incorporated. However, as shown in FIG. 4, a backup board 19 may be provided separately from the board 10 incorporating the ROM 11 for storing game software, the backup board 19 incorporating the RAM 15 and the backup battery 17 and being connectable with the game machine 20. Further, as shown in FIG. 5, the backup battery 17 and the RAM 15 serving as the backup memory may be incorporated in the game machine 20.

When the backup memory (the RAM 15) is incorporated in the same board 10 as the ROM 11, as in the first embodiment shown in FIG. 1, this means that the game program and the information on a suspended game are incorporated together in a single component. Thus, this arrangement is advantageous in that a plurality of games, each requiring a long period of time to complete one game, can be easily handled.

Needless to say, when the board 10 incorporates the ROM 11 alone, the board 10 may be an IC card, a form more compact than a board.

The supply of power to the RAM 15 serving as the backup memory is arranged as follows. The backup memory is supplied with electric power from the drive power supply 29 provided in the game machine 20 when the drive power supply 29 is in operation, and the backup memory is powered by the backup battery 17 only when the drive power supply 29 is not in operation. However, the arrangement for the supply of power may alternatively be such that the backup battery 17 is used as the sole power supply of the RAM 15, thereby simplifying the circuit arrangement.

In the foregoing embodiments, the game equipment comprises the game machine 20 incorporating a battery as the drive power supply 29, and having the picture display 28 such as an LCD. However, since the game equipment includes the image processing unit 27 which produces a video signal in order to send image information to the picture display 28, the present invention is also applicable to game equipment having a picture display 28 constituted by the CRT of, e.g., a television receiver for domestic use, the external display constituted by the CRT or the like being connected to the game machine 20 of the equipment. Even when the drive power supply comprises, instead of a battery, a power source (such as that for domestic use) connected with an adapter, the above-described advantage of the present invention is provided, that is, a game which has been interrupted upon an abrupt disconnection of the power source or because of the player's urgent need for the interruption, can be played again after the recovery of the power supply or after the player's return from his urgent business, and the game can be continued from the situation in which the previous game activity has ended.

The above-described embodiments are to be regarded as illustrative rather than limitative. The scope of the present invention is defined by the following claims, and includes all the modifications that can be made without departing from the spirit of the present invention as defined by the claims.

What is claimed is:

1. Game equipment having a read-only memory for storing a game program, a microprocessor for controlling the game program stored in the read-only memory, random-access memories having registers for storing informations of a game and, a screen RAM, said game equipment being adapted to be operated by an operation keyboard and the microprocessor associated therewith in accordance with the game program stored in the read-only memory, game operated by the keyboard being adapted to be displayed on a picture display score, said game equipment comprising:

a backup battery, a backup memory actuated by the backup battery, recognition means for recognizing information of registers in the random-access memories used to display on the picture display screen, said information being changed continuously in accordance with process of the game, transfer means for transferring the information of the registers recognized by the recognition means to the backup memory, and drive means for automatically actuating the transfer means repeatedly at a substantially predetermined interval without a specific command, said backup memory, when new information recognized by the recognition means is transferred to the backup memory by the transfer means, storing the new information by erasing information stored already therein, said game equipment, when started, reading the information in the backup memory so that the game can be started based on the information stored in the backup memory.

2. Game equipment according to claim 1, wherein said read-only memory, said backup battery, and said backup memory are all incorporated in a single board of said equipment, while said microprocessor, said random-access memories, said operation keyboard and said picture display screen are all incorporated in a game machine of said equipment.

3. Game equipment according to claim 1, wherein said read-only memory is incorporated in a first board of said equipment, and said backup battery and said backup memory are incorporated in a second board of said equipment which is different from said first board.

4. Game equipment according to claim 3, wherein said first board incorporating said read-only memory comprises an IC card.

5. Game equipment according to claim 1, wherein said backup battery and said backup memory are incorporated in a game machine of said equipment.

6. Game equipment according to claim 1, wherein said backup memory is supplied with electric power from a drive power supply provided in said game machine when said drive power supply is in operation, said backup memory being supplied with electric power from said backup battery only when said drive power supply is not in operation.

7. Game equipment according to claim 6, wherein said drive power supply comprises a power source connected with an adapter.

8. Game equipment according to claim 1, wherein said backup battery is the sole power supply of said backup memory.

9. Game equipment according to claim 1, wherein said picture display screen comprises the screen of a cathode-ray tube.

10. Game equipment according to claim 1, wherein said picture display screen comprises the screen of a television receiver.

11. Game equipment according to claim 1, wherein said recognition means memorizes new information whenever information of the registers is changed.

12. Game equipment according to claim 1, wherein said transfer means operates whenever information of the registers for displaying on the screen is changed.

* * * * *